(12) United States Patent
Kojima et al.

(10) Patent No.: US 12,215,227 B2
(45) Date of Patent: Feb. 4, 2025

(54) OIL-IN-WATER SILICONE EMULSION COMPOSITION AND USE THEREOF

(71) Applicant: DOW TORAY CO., LTD., Tokyo (JP)

(72) Inventors: Kazuhiko Kojima, Ichihara (JP); Tsugio Nozoe, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 574 days.

(21) Appl. No.: 17/620,380

(22) PCT Filed: Jun. 12, 2020

(86) PCT No.: PCT/JP2020/023278
§ 371 (c)(1),
(2) Date: Dec. 17, 2021

(87) PCT Pub. No.: WO2020/255895
PCT Pub. Date: Dec. 24, 2020

(65) Prior Publication Data
US 2022/0251385 A1    Aug. 11, 2022

(30) Foreign Application Priority Data

Jun. 21, 2019 (JP) .................... 2019-115216

(51) Int. Cl.
| | | |
|---|---|---|
| C08L 83/04 | (2006.01) | |
| C08G 77/06 | (2006.01) | |
| C08G 77/16 | (2006.01) | |
| C08G 77/26 | (2006.01) | |
| C08K 3/34 | (2006.01) | |
| C08K 3/36 | (2006.01) | |
| C08K 5/17 | (2006.01) | |
| C08K 5/42 | (2006.01) | |
| C08K 5/5419 | (2006.01) | |
| C08L 71/02 | (2006.01) | |
| C09D 183/04 | (2006.01) | |

(52) U.S. Cl.
CPC .............. *C08L 83/04* (2013.01); *C08G 77/06* (2013.01); *C08G 77/16* (2013.01); *C08G 77/26* (2013.01); *C08K 3/346* (2013.01); *C08K 3/36* (2013.01); *C08K 5/17* (2013.01); *C08K 5/42* (2013.01); *C08K 5/5419* (2013.01); *C08L 71/02* (2013.01); *C09D 183/04* (2013.01); *C08L 2201/52* (2013.01)

(58) Field of Classification Search
None
See application file for complete search history.

(56) References Cited

U.S. PATENT DOCUMENTS

| | | |
|---|---|---|
| 5,789,084 A | 8/1998 | Nakamura et al. |
| 5,844,742 A | 12/1998 | Yarmchuk et al. |
| 5,877,256 A | 3/1999 | Nakamura et al. |
| 6,177,365 B1 | 1/2001 | Li |
| 6,177,366 B1 | 1/2001 | Li |
| 6,425,600 B1 | 7/2002 | Fujiki et al. |
| 6,511,754 B1 | 1/2003 | Bohin et al. |
| 6,709,752 B1 | 3/2004 | James et al. |
| 7,198,854 B2 | 4/2007 | Dumont et al. |
| 2006/0121300 A1 | 6/2006 | Matsumura |
| 2010/0190395 A1 | 7/2010 | Nozoe et al. |
| 2010/0190396 A1 | 7/2010 | Nozoe et al. |
| 2011/0319557 A1 | 12/2011 | Kojima et al. |
| 2012/0004354 A1* | 1/2012 | Kojima ............... C09D 183/04 524/500 |
| 2012/0288649 A1* | 11/2012 | Blackwood ........... D06N 3/128 508/141 |
| 2013/0143989 A1 | 6/2013 | Kojima et al. |
| 2020/0165454 A1 | 5/2020 | Inokuchi |

FOREIGN PATENT DOCUMENTS

| | | |
|---|---|---|
| EP | 0915122 A1 | 5/1999 |
| EP | 3988618 A1 | 4/2022 |
| FR | 2848878 A1 | 6/2004 |
| JP | S5616553 A | 2/1981 |

(Continued)

OTHER PUBLICATIONS

Machine assisted English translation of FR2848878A1 obtained from https://worldwide.espacenet.com/patent on Jun. 20, 2023, 27 pages.
Machine assisted English translation of JP2010046907A obtained from https://worldwide.espacenet.com/patent on Jun. 20, 2023, 24 pages.
International Search Report for PCT/JP2020/023278 dated Sep. 1, 2020, 3 pages.
International Search Report for PCT/JP2020/023277 dated Aug. 11, 2020, 2 pages.
Machine assisted English translation of JP2003277238 obtained from https://patents.google.com/patent on Apr. 4, 2022, 8 pages.

(Continued)

*Primary Examiner* — Richard A. Huhn
(74) *Attorney, Agent, or Firm* — Warner Norcross + Judd LLP

(57) ABSTRACT

An oil-in-water type silicone emulsion composition is provided that can be uniformly coated onto a substrate and can, upon removing water content, form a cured film with low surface tackiness and excellent adhesive properties to a substrate and film strength. The oil in water type silicone emulsion composition comprises: (A) 100 parts by mass of polyorganosiloxane having at least two hydroxyl groups or hydrolyzable groups bonded to a silicon atom in one molecule, where the viscosity at 25° C. is within a range of 100,000 mPa-s to 20,000,000 mPa-s; (B) 45 to 120 parts by mass of colloidal silica (based on solid fraction); (C1) 1 to 100 parts by mass of an ionic emulsifier; and (D) 0 to 500 parts by mass of water (excluding water content in component (B), if any). Optionally, the composition further comprises (C2) a polyoxyethylene-polyoxypropylene copolymerized nonionic emulsifier. The composition can be used as a surface treating agent.

11 Claims, No Drawings

(56) References Cited

FOREIGN PATENT DOCUMENTS

| | | |
|---|---|---|
| JP | S59152972 A | 8/1984 |
| JP | H0673291 A | 3/1994 |
| JP | H09165554 A | 6/1997 |
| JP | H10168393 A | 6/1998 |
| JP | H11193349 A | 7/1999 |
| JP | 2003277238 A | 10/2003 |
| JP | 2006159554 A | 6/2006 |
| JP | 2010046907 A | 3/2010 |
| JP | 2010235930 A | 10/2010 |
| JP | 2010235931 A | 10/2010 |
| JP | 2013516522 A1 | 5/2013 |
| WO | 2008020605 A1 | 2/2008 |
| WO | 2008020635 A1 | 2/2008 |
| WO | 2012002571 A1 | 1/2012 |
| WO | 2017007920 A1 | 1/2017 |
| WO | 2019012899 A1 | 1/2019 |

OTHER PUBLICATIONS

Machine assisted English translation of JPH0673291 obtained from https://patents.google.com/patent on Apr. 18, 2022, 8 pages.
Machine assisted English translation of the JPS59152972, obtained from https://patents.google.com/patent on Apr. 4, 2022, 4 pages.
Machine assisted English translation of JPH09165554 obtained from https://patents.google.com/patent on Apr. 4, 2022, 11 pages.
Machine assisted English translation of JPH10168393 obtained from https://patents.google.com/patent on Apr. 4, 2022, 11 pages.
Machine assisted English translation of JPS5616553 obtained from https://patents.google.com/patent on Apr. 4, 2022, 10 pages.

* cited by examiner

OIL-IN-WATER SILICONE EMULSION COMPOSITION AND USE THEREOF

CROSS-REFERENCE TO RELATED APPLICATIONS

This application is the National Stage of International Appl. No. PCT/JP2020/023278 filed on 12 Jun. 2020, which claims priority to and all advantages of Japanese Appl. No. 2019-115216 filed on 21 Jun. 2019, the content of which is hereby incorporated by reference.

TECHNICAL FIELD

The present invention relates to an oil-in-water type silicone emulsion composition, particularly relates to an oil-in-water type silicone emulsion composition containing a relatively large amount of colloidal silica and an application thereof, and more particularly relates to an oil-in-water type silicone emulsion composition containing colloidal silica which, upon removal of water content, forms a friction-reducing cured film having rubber-like elasticity, and a tack-free surface.

Oil-in-water type silicone emulsion compositions, which form a cured film having mold releasability, releasability, water repellency, stain resistance, and heat resistance upon removal of water content, are used in paints, paper coating agents, mold release agents, release agents, fiber treatment agents, cosmetic products, and the like. Such proposed technologies include a composition containing a hydroxyl group-containing diorganopolysiloxane, a silicone resin, and an aminoxy group-terminated diorganopolysiloxane (for example, see Patent Document 1), a composition obtained by mixing and then emulsifying a compound selected from hydroxyl group-containing diorganopolysiloxanes, linear siloxanes having an aminoxy group in a side chain as a cross-linking agent, cyclic aminoxysiloxanes, aminoxysilanes, partial hydrolysis products thereof (for example, see Patent Document 2), and the like. However, these compositions had problems where the strength of a cured film and close fitting properties of the cured film to a substrate were not sufficient, and pressure-sensitive adhesive properties remained on a substrate surface.

In order to solve this problem, oil-in-water type silicone emulsion compositions containing colloidal silica have been proposed, such as Patent Documents 3 to 6 and the like. Furthermore, in Patent Document 7, the present applicant has also proposed an oil-in-water type silicone emulsion composition and an application thereof, in which an organic tin compound is not required as a curing catalyst, the amount of a volatile siloxane oligomer is low, and a cured film having rubber-like elasticity can be formed by removing water content.

However, these compositions still leave room for improvement in terms of the strength of a cured film and close fitting properties of the cured film to a substrate, and the surface of the cured film remains tacky. Therefore, problems particularly remain where application is not possible for substrates where smooth surface/feel is required and substrates where a friction-reducing surface is required.

RELATED ART DOCUMENTS

Patent Documents

Patent Document 1: Japanese Unexamined Patent Application No. H06-73291
Patent Document 2: Japanese Unexamined Patent Application No. H11-193349
Patent Document 3: Japanese Unexamined Patent Application No. S56-16553
Patent Document 4: Japanese Unexamined Patent Application No. S59-152972
Patent Document 5: Japanese Unexamined Patent Application No. H09-165554
Patent Document 6: Japanese Unexamined Patent Application No. H10-168393
Patent Document 7: International Publication Pamphlet WO 2012/002571 (Patent Registration No. 5848704)

SUMMARY OF THE INVENTION

Problem to be Solved by the Invention

An object of the present invention is to provide: an oil-in-water type silicone emulsion composition that can be uniformly coated onto a substrate, and can, upon removing water content, form a cured film with low surface tackiness (tack) and excellent close fitting properties and film strength relative to a substrate; and an application and manufacturing method thereof.

Means for Solving the Problem

As a result of extensive studies in order to solve the aforementioned problems, the present inventors discovered that the problem can be solved by an oil-in-water type silicone emulsion composition containing (A) 100 parts by mass of polyorganosiloxane having at least two hydroxyl groups or hydrolyzable groups bonded to a silicon atom in one molecule, where the viscosity at 25° C. is within a range of 100,000 mPa·s to 20,000,000 mPa·s, (B) 45 to 120 parts by mass of colloidal silica (based on solid fraction), (C1) 1 to 100 parts by mass of an ionic emulsifier, and (D) 0 to 500 parts by mass of water (however, excluding water content in the colloidal silica), and preferably an oil-in-water type silicone emulsion composition further containing (C2) 0.1 to 50 parts by mass of a polyoxyethylene-polyoxypropylene copolymerized nonionic emulsifier, and use of this composition as a surface treating agent, thereby arriving at the present invention. The oil-in-water type silicone emulsion composition can form a cured film having excellent close fitting properties and film strength on a substrate based on the structure described above, and contains a relatively large amount of colloidal silica (as calculated by solid fractions) relative to component (A). Therefore, a surface of a formed cured film is smooth and tack-free with no pressure-sensitive adhesion, and thus a smooth cured film having excellent friction-reducing properties can be formed on a surface of a substrate.

Effects of the Invention

The oil-in-water type silicone emulsion composition of the present invention can be uniformly coated onto a surface of a substrate, and contains a relatively large amount of colloidal silica (as calculated by solid fractions) relative to component (A), and therefore can, upon removing water content, form a cured film with low surface pressure-sensitive adhesiveness (tack) and excellent close fitting properties and film strength on a substrate. The oil-in-water type silicone emulsion composition can form a cured film having rubber-like elasticity and friction-reducing properties with no surface tackiness by removing water content. Therefore, the oil-in-water type silicone emulsion composition can be suitably used as a surface treatment agent, and enables providing a substrate provided with the cured film.

According to a method of manufacturing an oil-in-water type silicone emulsion composition of the present invention, the oil-in-water type silicone emulsion composition of the present invention can be efficiently manufactured. Furthermore, according to a surface treating method of the present invention, a cured film having sufficient strength on a wide range of types of substrate surfaces, in other words, rubber-like elasticity and sufficient close fitting properties to the substrate, and having low surface pressure-sensitive adhesion (tack) and smooth and excellent friction-reducing properties can be efficiently formed on the surface of a substrate.

[Preferred Mode for Carrying Out the Invention]

The oil-in-water type silicone emulsion composition of the present invention will be described below in detail.

Component (A)

Component (A) is a polyorganosiloxane having at least two groups selected from a group consisting of hydroxyl groups, alkoxy groups, and alkoxyalkoxy groups bonded to a silicon atom in one molecule, having a viscosity at 25° C. within a range of 100,000 to 20,000,000 mPa·s, and is a primary component of the oil-in-water type silicone emulsion composition of the present invention. A molecular structure of the polyorganosiloxane of component (A) may be a straight chain, cyclic, branched, dendritic, or reticulated, but is preferably a straight chain or partially branched straight chain. The group selected from a group consisting of hydroxyl groups, alkoxy groups, and alkoxyalkoxy groups may be present at an end of the molecular chain, may be present on a side chain of the molecular chain, or may be present on both. The alkoxy group is preferably a methoxy group, ethoxy group, n-propoxy group, isopropoxy group, n-butoxy group, t-butoxy group, hexyloxy group, cyclohexyloxy group, octyloxy group, decyloxy group, or other alkoxy group having 1 to 10 carbon atoms, and the alkoxyalkoxy group is preferably a methoxymethoxy group, a methoxyethoxy group, an ethoxymethoxy group, a methoxypropoxy group, or other alkoxyalkoxy group having 2 to 10 carbon atoms.

Examples of an organic group bonded to a silicon atom other than group selected from a group consisting of hydroxyl groups, alkoxy groups and alkoxyalkoxy groups include unsubstituted monovalent hydrocarbon groups and substituted monovalent hydrocarbon groups. The non-substituted monovalent hydrocarbon groups preferably have 1 to 10 carbon atoms from the perspective of an emulsification assisting function, and is preferably an alkyl group having 1 to 10 carbon atoms, an aryl group having 6 to 10 carbon atoms, or an alkenyl group having 2 to 10 carbon atoms, and particularly preferably a methyl group or phenyl group.

Examples of the substituted monovalent hydrocarbon groups include groups where a portion or all hydrogen atoms in the aforementioned unsubstituted monovalent hydrocarbon groups, and particularly alkyl groups or phenyl groups having 1 to 10 carbon atoms, is substituted by a substitution group such as: fluorine, chloride, or other halogen atom; an epoxy function group; a methacrylic functional group; an acrylic functional group; an amino functional group; a sulfur-containing functional group; an alkoxy group; a hydroxycarbonyl group; an alkoxycarbonyl group; or the like.

From the perspective of the strength and close fitting properties to a substrate of a cured film obtained by removing water content of the oil-in-water type silicone emulsion composition of the present invention, reduction of surface pressure-sensitive adhesion (tack) of the cured film containing component (B), and reduction of friction, the viscosity of component (A) at 25° C. is within a range of 100,000 to 20,000,000 mPa·s, more preferably within a range of 300,000 mPa·s to 10,000,000 mPa·s, even more preferably within a range of 500,000 mPa·s to 5,000,000 mPa·s, and most preferably within a range of 750,000 mPa·s to 3,500,000 mPa·s. If the viscosity of component (A) is less than the lower limit described above, and even if the amount of component (B) is within a range described later, the strength of the cured film obtained by removing water content from the oil-in-water type silicone emulsion composition and close fitting properties thereof to a substrate may be insufficient. Furthermore, surface tackiness of the cured film may occur, and thus a smooth surface may not be achieved. On the other hand, if the viscosity of component (A) exceeds the upper limit described above, there are problems where synthesizing by emulsion polymerization is difficult and a stable emulsion is difficult to obtain by an ordinary method.

Such a component (A) is preferably a diorganopolysiloxane having both ends of a molecular chain blocked by hydroxyl groups. An example of such a diorganopolysiloxane with both ends of a molecular chain blocked by hydroxyl groups includes a polyorganosiloxane expressed by the general formula: $HO(R^1_2 SiO)_m$. Note that in the formula above, $R^1$ is the same as an unsubstituted or substituted monovalent hydrocarbon group bonded to a silicon atom other than the aforementioned hydroxyl group or hydrolyzable group, and is preferably an alkyl group having 1 to 10 carbon atoms, an aryl group having 6 to 10 carbon atoms, or an alkenyl group having 2 to 10 carbon atoms, and particularly preferably a methyl group or phenyl group. m is an integer of 2 or more, and the viscosity at 25° C. is in the viscosity range described above and is preferably a number between 100,000 mPa·s and 20,000,000 mPa·s.

The polyorganosiloxane with the structure described above can be used as this manner of component (A), and a manufacturing method thereof is not is not particularly limited. A polyorganopolysiloxane obtained by a known manufacturing method such as equilibrium polymerization or the like may be emulsified in water with an emulsifier such as component (C1) described later or the like. However, from the perspective of handling workability during manufacturing and particle size and stability during emulsification and dispersion, an organopolysiloxane obtained by emulsion polymerization using an organopolysiloxane with a lower degree of polymerization, which is a precursor of component (A), can be preferably used.

It is particularly preferably (a) a polyorganosiloxane having at least two hydroxyl groups or hydrolyzable groups bonded to a silicon atom serving as a precursor of component (A) and (b) a polyorganosiloxane obtained by emulsion polymerizing an organic silicon compound containing an aminoxy group having an average of two aminoxy groups bonded to a silicon atom in one molecule, in the presence of a component (C1) described later, and more preferably further in the presence of a component (C2).

The polyorganosiloxane (a) having at least two hydroxyl or hydrolyzable groups bonded to silicon atoms in one molecule serving as a precursor of component (A) is a raw material component containing component (A) described above, and is preferably a chain polyorganosiloxane with a lower viscosity than component (A) having hydroxyl groups or hydrolyzable groups bonded to a silicon atom at both ends of a molecular chain. More specifically, component (a) is an organopolysiloxane blocked with hydroxyl groups at both ends of a molecular chain, having a viscosity at 25° C. that is lower than component (A), and particularly, 100,000 mPa·s or less, and preferably within a range of 50 to 50,000 mPa·s, and is most preferably a polyorganosiloxane as expressed by $HO(R^1{}_2SiO)_nH$, where n represents a number in which the viscosity of component (a) at 25° C. is within the aforementioned viscosity range, and is preferably within a range of 50 to 50,000 mPa·s. Note that in the formula, $R^1$ is the same as an unsubstituted or substituted monovalent hydrocarbon group bonded to a silicon atom other than the hydroxyl group or hydrolyzable group described above, and is particularly preferably a methyl group or phenyl group.

The aminoxy group-containing organic silicon compound (b) having an average of two aminoxy groups bonded to a silicon atom in one molecule is a component for promoting the formation of a cured film having favorable surface hardness and rubber-like elasticity without tackiness feel by reacting and cross-linking with component (a).

Component (b) contains an aminoxy group bonded to an average of two silicon atoms in one molecule, and two aminoxy groups may be present on average only on a side chain of a molecular chain, may be present only at both ends of the molecular chain, or one each may be present on average in both an end of the molecular chain and a side chain of the molecular chain. If the average number of aminoxy groups in component (b) is three or more in one molecule, gelation of the mixture may occur inside an emulsifying device or in a pre-mixing process before emulsification. Furthermore, elongation of the resulting cured film may be inferior.

Such aminoxy group-containing organic silicon compounds include polydiorganosiloxanes blocked with aminoxy groups at both ends of a molecular chain, diorganosiloxane/organoaminoxysiloxane copolymers blocked with an aminoxy group at one end of a molecular chain, diorganosiloxane/organoaminoxysiloxane copolymers blocked with triorganosilyl groups at both ends of a molecular chain, cyclic diorganosiloxane/organoaminoxysiloxane copolymers, and diaminoxydiorganosilanes. Of these, polydiorganosiloxanes blocked with aminooxy groups at both ends of a molecular chain are preferred. The blending amount of component (b) is 0.1 to 100 parts by mass, preferably 0.5 to 50 parts by mass, and more preferably 1 to 20 parts by mass with regard to 100 parts by mass of component (a).

Component (b) is preferably expressed by general formula:

$$R^2R^1{}_2SiO(R^1R^3SiO)_n(R^1{}_2(SiO)_pSiR^1{}_2R^2.$$

In the formula above, $R^1$ is the same as described above, but is preferably an alkyl group having 1 to 10 carbon atoms, an aryl group having 6 to 10 carbon atoms, or an alkenyl group having 2 to 10 carbon atoms, and particularly preferably a methyl group or phenyl group. $R^3$ is an aminoxy group. When n is zero, $R^2$ is an aminoxy group; when n is 1, one $R^2$ is an aminoxy group, and remaining Res are a group selected from a group consisting of unsubstituted monovalent hydrocarbon groups having 1 to 10 carbon atoms, halogen-substituted monovalent hydrocarbon groups having 1 to 10 carbon atoms, hydroxyl groups, alkoxy groups having 1 to 10 carbon atoms and alkoxyalkoxy groups having 2 to 10 carbon atoms; and when n is 2, $R^2$ is a group selected from a group consisting of unsubstituted monovalent hydrocarbon group having 1 to 10 carbon atoms, halogen-substituted monovalent hydrocarbon groups having 1 to 10 carbon atoms, hydroxyl groups, 1 to 10 alkoxy groups having 1 to 10 carbon atoms, and alkoxyalkoxy groups having 2 to 10 carbon atoms.

Examples of the unsubstituted monovalent hydrocarbon group includes the same groups as described above, but is preferably an alkyl group having 1 to 10 carbon atoms, an aryl group having 6 to 10 carbon atoms, or an alkenyl group having 2 to 10 carbon atoms, and particularly preferably a methyl group or phenyl group. The halogen-substituted monovalent hydrocarbon group is a group in which a portion or all hydrogen atoms of the aforementioned unsubstituted monovalent hydrocarbon group are substituted with halogen atoms, and is preferably a chloromethyl group, a 3,3,3-trifluoropropyl group, a 3,3,4,4,5,5,5-heptafluoropentyl, a difluoromonochloropropyl group, or other halogen-substituted alkyl group. Examples of the alkoxy group and the alkoxyalkoxy group include the same groups as described above.

Examples of the aminoxy group include groups selected from $-ON(R^4)_2$ and a group expressed by the following formula.

Formula 1

In the formula, $R^4$ is a straight chain or branched alkyl group having 1 to 5 carbon atoms. In the formula, $R^5$ is a divalent hydrocarbon group having 2 to 15 carbon atoms or a divalent organic group having a molecular main chain containing 3 to 17 carbon atoms and 1 to 3 nitrogen atoms or 1 to 2 oxygen atoms, and examples include $-(CH_2)_2-$, $-(CH_2)_5-$, $-(CH_2)_6-$, $-(CH_2)_7-$, $-(CH_2)_2-O-(CH_2)_2-$, $-(CH=CH)-(CH=CH)-$, $-(CH=N)-(CH=CH)-$, $-(C_6H_4)-(CH_2)_2-$. Of these, $-(CH_2)_6-$, $-(CH_2)_2-O-(CH_2)_2-$ are preferred. Of these, a dialkyl aminoxy group in which an alkyl group with 1 to 5 carbon atoms is bonded to a nitrogen atom is preferred. Preferred examples of aminoxy groups include dimethyl aminoxy groups, diethyl aminoxy groups, dipropyl aminoxy groups, dibutyl aminoxy groups, diheptyl aminoxy groups, ethyl methyl aminoxy groups, propyl methyl aminoxy groups, propyl ethyl aminoxy groups, butyl methyl aminoxy groups, butyl ethyl aminoxy groups, butyl propyl aminoxy groups, heptyl methyl aminoxy groups, heptyl ethyl aminoxy groups, heptyl propyl aminoxy groups, and heptyl butyl aminoxy groups. A diethyl aminoxy group is preferred.

Furthermore, in the formula above, n is 0, 1 or 2, preferably 0 or 2, and more preferably 0. When n is 0, $R^2$ in the formula above is an aminoxy group, and when n is 1, at least one $R^2$ in the formula above is an aminoxy group. Of these, n in the formula above is preferably 0, and $R^2$ is preferably an aminoxy group from the perspective of ease of availability.

In the formula, p is an integer of 0 or more. Although the upper limit of p is not particularly limited, from the perspective of ease of emulsification, p is preferably an integer within a range of 0 to 1000 more preferably within a range of 2 to 200, and most preferably within a range of 4 to 140.

Examples of such aminoxy group-containing organic silicon compounds include aminoxy group-containing organic silicon compounds as expressed by the following formulae. Note that in the formulae, Me indicates a methyl group, Et indicates an ethyl group, and Pr indicates a propyl group.

$(Et_2NO)Me_2SiOSiMe_2(ONEt_2)$ $(Et_2NO)Me_2SiO(Me_2SiO)_{12}SiMe_2(ONEt_2)$ $(Et_2NO)Me_2SiO(Me_2SiO)_{40}SiMe_2(ONEt_2)$ $(Et_2NO)Me_2SiO(Me_2SiO)_{80}SiMe_2(ONEt_2)$ $Me_2Si(ONEt_2)_2$ $Me_3SiO(MeSi(ONEt_2)O)_2SiMe_3$ $Me_3SiO(Me_2SiO)_4(MeSi(ON\ Et_2)O)_2SiMe_3$ $Me_3SiO(Me_2SiO)_{15}(MeSi(ON\ Et_2)O)_2SiMe_3$ $Me_3SiO(Me_2SiO)_3(MeSi(ONEt_2)O)_7SiMe_3$

Furthermore, if component (b) remains in the oil-in-water type silicone emulsion composition, the component contributes to reaction/cross-linking between component (A) and component (B), and can form a cured film with favorable surface hardness and rubber-like elasticity without a tacky feel.

Component (B)

Colloidal silica (B) is a component for improving the strength of a cured film and improving the close fitting properties to a substrate, and is a component that can form a cured film having excellent friction reducing properties, that is smooth on a substrate surface, and has low surface pressure-sensitive adhesion (tack) because the composition of the present invention contains a relatively large amount of colloidal silica as compared to component (A), in terms of solid fraction.

Colloidal silica is available as an aqueous dispersion in which 5 to 40 mass % of silica particles is dispersed in water in a colloidal shape, and has many silanol groups on the surface. The particle size is generally approximately 1 nm to 1 μm. The colloidal silica is preferably a basic aqueous dispersion stabilized by sodium ions or ammonium ions. The pH of the colloidal silica serving as a basic aqueous dispersion is preferably 7.0 or higher, and more preferably above 9.0. The shape of the fine silica particles of the colloidal silica is not particularly limited and is generally spherical, but elongated or pearl necklace-shaped particles may also be used.

In the present invention, the blend amount of component (B) must be within a range of 45 to 120 parts by mass in terms of solid fraction, preferably within a range of 50 to 110 parts by mass, and particularly preferably within a range of 55 to 100 parts by mass, relative to 100 parts by mass of component (A).

Herein, the solid fraction of the colloidal silica refers to a non-volatile silica particle fraction. When the blend amount of component (B) is within the aforementioned range, water is removed from the oil-in-water silicone emulsion composition of the present invention, and thus smoothness can be imparted to the surface of a cured film primarily containing component (A) or a cross-linked reaction product thereof. In contrast, if the amount of component (B) is less than the lower limit described above, pressure-sensitive adhesion (tack) may occur on the surface of the cured film. If the blend amount of component (B) exceeds the upper limit described above, the flexibility, rubber elasticity, followability to the surface of a substrate, and close fitting properties of the cured film may be insufficient. Thus, cracks or peeling of the obtained cured film, and pressure-sensitive adhesion (tack) may occur on the surface of the cured film.

The colloidal silica of component (B) can be added during or after polymerization when the polyorganosiloxane in component (A) is obtained by emulsion polymerization. Specifically, an aqueous dispersion of the colloidal silica particles containing water may be added to an emulsion containing the polyorganosiloxane of component (A), or an aqueous dispersion of the colloidal silica particles may be added to an emulsion containing the aforementioned component (a) or the like serving as a precursor of component (A) to advance an emulsion polymerization reaction.

Examples of such colloidal silica include SNOWTEX 20, SNOWTEX 30, and the like manufactured by Nissan Chemical Industries, Ltd.; ADELITE AT-20 and the like manufactured by Asahi Denka Co., Ltd.; KREVOSOL 30R9 and the like, manufactured by Clariant Japan; LUDOX (registered trademark) HS-40 and the like manufactured by DuPont; CATALOID S-20L and the like manufactured by JGC Catalysts and Chemicals Ltd.; SILICADOL S-20 and the like manufactured by Nippon Chemical Industrial Co., Ltd.; and the like.

Component (C1)

The ionic emulsifier of component (C1) is a component that stably emulsifies component (A), and if necessary component (F), in component (D). The added amount of component (C1) is 1 to 100 parts by mass, preferably 1 to 50 parts by mass, and more preferably 1 to 20 parts by mass, with regard to 100 parts by mass of component (A).

An anionic surfactant, cationic surfactant, or amphoteric surfactant can be used as the ionic emulsifier of component (C1). One type of such surfactant may be used alone as an ionic emulsifier, and two or more surfactants of different types may be used in combination.

Examples of anionic surfactants include alkylbenzene sulfonate, alkyl ether sulfate, polyoxyethylene alkyl ether sulfate, polyoxyethylene alkyl phenyl ether sulfate, alkyl naphthyl sulfonate, unsaturated aliphatic sulfonate, and hydroxylated aliphatic sulfonate.

Examples of cationic surfactants include quaternary ammonium type salt surfactants, such as: octadecyl trimethyl ammonium chloride, hexadecyl trimethyl ammonium chloride, and other alkyl trimethyl ammonium salts; dioctadecyldimethyl ammonium chloride, dihexadecyldimethyl ammonium chloride, didecyldimethyl ammonium chloride, and other dialkyldimethyl ammonium salts; and the like.

Examples of amphoteric surfactants include alkylbetaines and alkylimidazolines.

The oil-in-water silicone emulsion composition of the present invention preferably uses the (C1) ionic emulsifier in combination with other non-ionic emulsifiers, from the perspective of stability.

The nonionic emulsifier that can be used in the present invention can be a known nonionic surfactant. Examples of nonionic surfactants include glycerin fatty acid esters, sorbitan fatty acid esters, polyoxyalkylene alkyl ethers, polyoxyalkylene alkyl phenyl ethers, polyoxyalkylene sorbitan fatty acid esters, polyoxyalkylene glycerin fatty acid esters, and polyoxyethylene-polyoxypropylene copolymer nonionic emulsifiers.

Component (C2)

In particular, the oil-in-water silicone emulsion composition of the present invention preferably also includes (C2) a polyoxyethylene-polyoxypropylene copolymer nonionic emulsifier as a nonionic emulsifier. By using component (C1) and component (C2) in combination, component (A) and component (F) can be stably emulsified with a small particle size in component (D), which is a dispersant, and in particular, when component (A) is formed by emulsion polymerization, the emulsion polymerization reaction can stably proceed to provide an emulsion of component (A) as a highly stable emulsion polymerization reaction product.

The polyoxyethylene-polyoxypropylene copolymer non-ionic emulsifier, which is component (C2), is usually a compound expressed by the following general formula (1) or general formula (2).

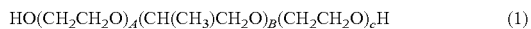

$$HO(CH_2CH_2O)_A(CH(CH_3)CH_2O)_B(CH_2CH_2O)_cH \quad (1)$$

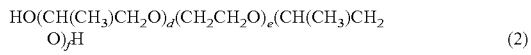

$$HO(CH(CH_3)CH_2O)_d(CH_2CH_2O)_e(CH(CH_3)CH_2O)_fH \quad (2)$$

In general formulas (1) and (2), a, b, c, d, e and f represent the average number of moles of ethylene oxide and propylene oxide, each independently being a number from 1 to 350. The weight average molecular weight of the component (C2) is preferably from 1,000 to 18,000, and more preferably from 1,500 to 10,000. If component (C2) is a solid, it is also possible to use as an aqueous solution.

More specific examples of compounds serving as component (C2) include the Pluronic (registered trademark) L series, Pluronic (registered trademark) P series, Pluronic (registered trademark) F series, and Pluronic (registered trademark) TR series manufactured by ADEKA CORPORATION; Emulgen PP-290 manufactured by Kao Corporation; and Newcol 3240 manufactured by Nippon Nyukazai Co., Ltd., which are available on the market.

The added amount of component (C2) is 0.1 to 50 parts by mass, and preferably 1 to 20 parts by mass, with regard to 100 parts by mass of component (A). Note that when component (C2) is used in combination with component (C1) and component (A) or a precursor component thereof is emulsified with the other optional components such as component (F), the particle size of the resulting emulsion particles can be reduced as compared to using each component alone, and the stability of the oil-in-water silicone emulsion composition can be improved.

Note that the total added amount of component (C1) and component (C2) is preferably 1 to 30 mass %, and more preferably 2 to 20 mass % of the total amount of component (F) that is added as necessary to component (A). Furthermore, the ratio of the added amount of component (C1) to the added amount of component (C2) is preferably within a range of 3:1 to 100:1.

By using the emulsifiers of components (C1) and (C2) described above, the cyclic siloxane, diorganopolysiloxane blocked at both ends of a molecular chain with hydroxyl groups, organoalkoxysilane, and the like can be emulsified and dispersed in water, and then, if necessary, a catalyst such as an acid, alkaline substance, or the like is added to perform a polymerization reaction, and by using the aforementioned emulsifiers, the polyorganosiloxane having at least two groups selected from a group consisting of hydroxyl groups, alkoxy groups, and alkoxyalkoxy groups bonded to a silicon atom and an aminoxy group-containing organic silicon compound having on average two aminoxy groups bonded to a silicon atom can be emulsified and dispersed in water, and then a polymerization reaction can be performed, and in particular, a stable emulsion containing a high viscosity component (A) can be obtained.

Component (D)

The amount of water as component (D) should be sufficient to maintain a stable aqueous emulsion state, and the amount to be added is not particularly limited, but is usually between 0 and 500 parts by mass, preferably 10 to 200 parts by mass, to 100 parts by mass of component (A).

In the present composition, component (D) is water that is added independently of component (B). Herein, although water is an essential component in the oil-in-water emulsion composition of the present invention, the colloidal silica of component (B) is in the form of an aqueous dispersion as described above, and the amount of water as component (D) may be 0 parts by mass, if water is added when adding component (B) (an aqueous dispersion of colloidal silica with a solid content of 30 mass % contains 70 mass % of water). If the entire emulsion composition is 100 mass %, the amount of water contained in the composition derived from components (B) and (D) is generally within a range of 5 to 95 mass % of the entire composition.

Component (E)

The oil-in-water emulsion composition of the present invention preferably contains one or more types of (E) a thickening agent, from the perspective of improving workability such as the application properties thereof, improving the storage stability of the composition, and especially the dispersion stability of component (B). In particular, using a thickening agent including a water-soluble organic polymer such as a water-soluble acrylic resin or the like or an inorganic thickening agent such as a clay mineral or the like has an advantage where the viscosity of the water can be increased, and thus the oil-in-water emulsion composition of the present invention or a surface treatment agent containing the composition can have enhanced workability and application properties to a substrate, without substantially impairing the technical effects of the present invention and the heat resistance/flammability of a cured film. The added amount of the thickening agent is arbitrary, but when a thickening agent is used, the amount is preferably selected such that the total composition is within the viscosity range described below (1000 mPa·s or higher at 25° C.).

The thickening agent used in the present invention is not particularly limited. Preferred examples include one or more types selected from (E1) thickening agents containing a clay mineral and (E2) thickening agents containing a water-soluble organic polymer.

The clay mineral may be either natural or synthetic, and examples include a natural or synthetic smectite clay such as bentonite, which is mainly composed of clay minerals, or a hydrophilic composite containing smectite clay and an anionic polymer such as polyacrylic acid, carboxyvinyl polymer, and the like. In other words, component (E) may and preferably includes a thickening agent containing a water-soluble organic polymer other than a clay mineral.

In detail, a thickening agent containing natural or synthetic (E1) clay mineral can be a natural or synthetic smectite clay such as bentonite, montmorillonite, hectorite, saponite, sauconite, bidelite, nontronite, and the like; magnesium aluminum silicate; or a compound material containing these minerals with a water-soluble organic polymer, or the like; but a smectite clay such as bentonite or montmorillonite or the like is preferable. The smectite clays are available, for example, as SUMECTON SA (manufactured by Kunimine Industries Co., Ltd.), which is a hydrothermally synthesized product, and BEN-GEL (manufactured by HOJUN., Co. Ltd.), which is a naturally refined product.

When imparting heat resistance and flame retardance to a substrate (for example, fabric for an airbag or building material) coated with the oil-in-water type silicone emulsion composition of the present invention, the pH of the smectite clay is preferably within a pH range of 5.0 to 9.0.

(E2) Examples of the thickening agent containing a water-soluble organic polymer include water-soluble organic polymers such as a polymer polysaccharide or a water-soluble acrylic resin, and these may be used individually, or in the form of a hydrophilic composite with a clay mineral. In particular, the use of a water-soluble organic polymer containing a carboxylate group is preferred, and preferred examples include polyacrylates, which are carboxyl-containing attached polymers, such as sodium polyacrylates, sodium polymethacrylates, and the like. Note that when the amount of the thickening agent containing these water-soluble organic polymers is excessive, the heat resistance and flame retardancy may be impaired in the cured film where water content was removed from the oil-in-water type silicone emulsion composition of the present invention, and thus the amount used is preferably selected depending on the application.

Component (E) may be in the form of a water dispersion of a thickening agent containing a clay mineral and a water-soluble organic polymer as described above, and in particular, the amount of the inorganic thickening agent, which is a clay mineral, is preferably within a range of 0.1 to 10 parts by mass, or 0.5 to 5 parts by mass, for 100 parts by mass of water.

Component (F)

The oil-in-water silicone emulsion composition of the present invention preferably contains (F) an alkoxysilane or alkoxyalkoxysilane, or a partially hydrolyzed condensation product of the alkoxysilane or alkoxyalkoxysilane expressed by the general formula: $R^1_a SiX_{4-a}$, from the perspective of strength and adhesive properties of the cured film. In the formula, R is the same as described above, and preferable examples include alkyl groups having 1 to 10 carbon atoms, aryl groups having from 6 to 10 carbon atoms, and alkenyl groups having 2 to 10 carbon atoms. In particular, a methyl group or a phenyl group is preferable. X is an alkoxy group having 1 to 10 carbon atoms or an alkoxyalkoxy group having 2 to 10 carbon atoms, and examples include the same groups as described above. a is 0, 1 or 2, but is preferably 0 or 1. In particular, component (F) is preferably a tetraalkoxysilane, alkyltrialkoxysi lane, tetraalkoxyalkoxysilane, or alkyltrialkoxyalkoxysilane, but tetraalkoxysilane and alkylalkoxysilane are more preferable.

Component (F) may be a partially hydrolyzed condensation product of the aforementioned organoalkoxysilane, organoalkoxyalkoxysilane, tetraalkoxysilane or tetraalkoxyalkoxysilane.

From the perspective of improving strength of the cured film and adhesive properties to a substrate, the amount of component (F) is preferably 0.1 to 50 parts by mass, and more preferably 1 to 15 parts by mass, with regard to 100 parts by mass of component (A). If the added amount of component (F) is less than 0.1 parts by mass relative to 100 parts by mass of component (A), the strength of a cured film formed by removing water content from a produced aqueous silicone emulsion composition may not be sufficiently improved. If the added amount exceeds 50 parts by mass, the amount of byproduct alcohol increases, which has a negative effect on the environment and the human body, and the formability of the cured film may change over time, which is not preferred.

Component (G)

With the oil-in-water silicone emulsion composition of the present invention, the amine compound (G) is preferably added as a pH adjusting agent. The amine compound is preferably diethylamine. These components (G) also function as curing catalysts, as described later, during water content removal, and therefore can promote condensation reactions of each component, and particularly can achieve curing reactivity free of heavy metals such as tin or the like.

The added amount of component (G) serving as the pH adjusting agent is preferably within a range of 0.01 to 5 mass %, and more preferably 0.1 to 2 mass %, with regard to the entire oil-in-water type silicone emulsion composition of the present invention.

Other Optional Components

The oil-in-water type silicone emulsion composition of the present invention may appropriately contain other components if necessary, and examples include pigments, defoaming agents, penetrating agents, antistatic agents, inorganic powders, preservatives, rust inhibitors, bis(trimethoxysilylpropyl)-disulfide and other silane coupling agents other than component (F), pH adjusters other than component (G), buffering agents, UV absorbers, curing catalysts, water-soluble resins, organic resin emulsions, pigments, solid lubricants, dyes, flame retardants, and the like. Note that when used in coating applications, the oil-in-water silicone emulsion composition of the present invention particularly preferably includes components selected from curing catalysts, pigments, solid lubricants, and flame retardants.

Curing Catalyst

The amount of the curing catalyst is optional, but the amount can be added in order to promote quick cross-linking curing of the components of the composition of the present invention by a condensation reaction. Specific examples thereof include: organic tin compounds such as dibutyltin dilaurate, dibutyltin diacetate, octenoic acid tin, dibutyltin dioctate, laurate tin, dioctyl tin diversate, dioctyl tin diacetate, dibutyl tin bisoleyl malate, and the like; organic titanium compounds such as tetrabutyl titanate, tetrapropyl titanate, dibutoxybis(ethyl acetoacetate)titanium, and the like; in addition, acidic compounds such as hydrochloric acid, sulfuric acid, dodecylbenzene sulfonic acid, and the like; alkaline compounds such as ammonia, sodium hydroxide, and the like; amine based compounds such as n-hexylamine, guanidine, 1,8-diazabicyclo[5.4.0]undecene (DBU), 1,4-diazabicyclo[2.2.2]octane (DABCO), and the like; organic zirconium esters such as zirconium tetrapropylate, zirconium tetrabutylate, and the like; organic zirconium chelates such as zirconium tributoxy acetylacetonate, zirconium butoxyacetylacetonate bisethylacetoacetate, zirconium tetraacetylacetonate, and the like; zirconium based condensation co-catalysts of zirconium bis(2-ethyl hexanoate)oxide, zirconium acetylacetonate(2-ethyl hexanoate)oxide, and other oxozirconium compounds, and the like; aluminum alcoholate such as aluminum triethylate, aluminum triisopropylate, aluminum tri(sec-butylate), and the like; aluminum chelate compounds such as diisopropoxy aluminum(ethyl acetoacetate)aluminum tris(ethyl acetoacetate), aluminum tris(acetylacetonate), and the like; aluminum based condensation co-catalysts of hydroxy aluminum bis(2-ethyl hexanoate), and other aluminum acyloxy compounds, and the like; and condensation reaction catalysts of zinc stearate, zinc octylate, zinc acetate, iron octylate, and other organic acid metal salts, and the like. Note that unless these curing catalysts are water-soluble, the curing catalysts are preferably in the form of an emulsion emulsified and dispersed in advance in water using a surfactant. Furthermore, the amine compound is a component that is common with component (G), and using these components allows design of a composition that does not contain a curing catalyst containing a metal such as tin or the like, which is preferred from the perspective of reducing impact on the environment. Note the amount of condensation reaction catalyst used in the composition of the present invention is not particularly limited and can be an arbitrary amount within a range that the object of promoting a condensation reaction is achieved. Note that the use of the condensation reaction catalyst is optional and use is not required in the present composition.

Pigment and Solid Lubricant

The oil-in-water silicone emulsion composition of the present invention may be and is preferably formulated with a pigment or solid lubricant. In particular, by adding a solid lubricant represented by phyllosilicate, which is also known as a layered silicate, an antifriction property that reduces friction and/or blocking can be imparted to the resulting cured film to further improve the friction reducing properties.

Specifically, examples of phyllosilicates suitable for use as a solid lubricant in the present invention include mica and talc, and examples include talc microspheres, kaolinite, smectite, sericite and chlorite.

Examples of the pigment can include inorganic pigments such as aluminum hydroxide, heavy calcium carbonate, light calcium carbonate, titanium oxide, barium sulfate, activated clay, magnesium carbonate, alumina, aluminum oxide, and the like; and organic pigments such as, for example, polystyrene resin particles, urea-formalin resin particles, polyolefin particles, and the like.

Flame Retardant

When the oil-in-water silicone emulsion composition of the present invention is applied to applications such as airbag coating or the like, a flame retardant may also be included for practical use. For example, the composition according to the present invention forms an antifriction dry coating film that reduces friction and/or blocking of a substrate surface, and therefore is suitable as a surface coating for airbags or the like. However, substrates such as airbags, by their very nature, are difficult to ignite and do not support combustion, and thus airbags generally require the addition of flame retardants in order to pass the rigorous flammability tests that may be applied to that application. If the oil-in-water type silicone emulsion composition of the present invention (=upper coating) is applied to a substrate such as a silicone rubber-coated airbag, flammability will be suppressed. However, an upper coating without a flame retardant, which is applied to an organic resin-coated airbag, may not pass the US Federal Motor Vehicles Safety Standards Test FMVSS #302 (hereinafter referred to as "FMVSS #302") and other flammability tests. Therefore, the addition of a flame retardant is important for practical use.

In particular, the composition according to the present invention is suitable in coating agents used in applications that require inflammability or flame retardance, such as an upper coating of an airbag or a coated fabric subsequently formed into an airbag, and the effect of the flame retardant is often most effective when present in the upper coating. An example of a preferred flame retardant is aluminum trihydrate that is preferably not surface treated. Furthermore, examples of flame retardants include other metal hydroxides such as magnesium hydroxide and the like, metal oxides such as ferrite oxide and titanium oxide and the like, carbonates such as zinc carbonate and the like, and carbon black. The amount of these flame-retardant components may be within a range of 2 to 40 mass %, and preferably 5 to 25 mass %, relative to the total amount of the composition, and a component in which at least a portion is aluminum trihydrate may be and is preferably selected as the flame retardant.

Overall Viscosity of Composition and Viscosity Measurement Method

The oil-in-water type silicone emulsion composition of the present invention has a viscosity of 1000 mPa·s or more, from the perspective of uniform coatability and workability. The viscosity is measured at 25° C. using a Wells-Brookfield Cone/Plate Viscometer provided with a 20 mm diameter 2° tapered cone, at a shear rate of 1s-1 measured (ASTM D4287). Unless otherwise indicated, viscosities described in the present specification were measured using the same technique as described above. Furthermore, the viscosity is the overall viscosity of the oil-in-water silicone emulsion composition, including solid lubricants, thickening agents, and the like, as necessary.

The average particle size (average primary particle size) of the silicone emulsion particles in the oil-in-water type silicone emulsion composition of the present invention may be within a range of 50 to 600 nm, preferably 300 nm or less, and particularly preferably 250 nm or less, from the perspective of storage stability, formability of a cured film, and stability when diluted in water. The average particle size of the emulsion particles can be measured by a dynamic light scattering method or the like.

Producing Method

The oil-in-water silicone emulsion composition of the present invention can be produced by a method that includes:

Step (I): a step of emulsifying and dispersing component (A), component (C1), and optionally, if necessary, component (C2), and a portion of component (D) using an emulsifier such as a homomixer, homogenizer, colloid mill, combomixer, in-line continuous emulsifier, vacuum emulsifier, ultrasonic emulsifier, continuous mixing device, or the like; and Step (II): a step of adding and dispersing component (B) and the remaining component (D) in the emulsion obtained in the aforementioned step.

Herein, component (B), component (E), component (F), and component (G) may be added in either of the aforementioned steps, or may be divided and added to both steps.

When the oil-in-water silicone emulsion composition of the present invention is manufactured, the polyorganosiloxane, which is component (A), may be obtained by an emulsion polymerization reaction. Specifically the method of manufacturing the oil-in-water silicone emulsion composition of the present invention may include a step of obtaining (a) a polyorganosiloxane having at least two hydroxyl groups or hydrolyzable groups bonded to a silicon atom serving as a precursor of component (A), or (b) a polyorganosiloxane obtained by emulsion polymerizing an organic silicon compound containing an aminoxy group having an average of two aminoxy groups bonded to a silicon atom in one molecule, in the presence of the aforementioned component (C1) and optionally component (C2). In this case, the water dispersion containing component (A), which is a polyorganosiloxane after emulsion polymerization, is an emulsion where component (A), component (C1), optionally component (C2), and (D), a portion of the water, are emulsified and dispersed, and this can be performed simultaneously with step (I) or as a part of step (I). Note that the above step (II) may be subsequently performed, and component (B), component (E), component (F), and component (G) may be added to the emulsion before the emulsion polymerization reaction, as necessary.

The oil-in-water silicone emulsion composition of the present invention may be reduced, if necessary, such that the total amount of siloxane oligomers containing 4 to 5 siloxane units may be 2 mass % or less, or 1 mass % or less, or may be 0.5 mass % or less. Examples of the siloxane oligomer containing 4 to 5 siloxane units include 4 to 5-mer cyclic siloxane oligomers such as octanoorganotetracyclosiloxane, decaorganopentacyclosiloxane, and the like; and 4 to 5-mer straight-chain siloxane oligomers such tetraorganopolysiloxane blocked with hydroxy diorganosiloxane groups at both ends of a molecular chain, hexaorganotrisiloxane blocked with hydroxydiorganosiloxane groups at both ends of a molecular chain, and the like. The amount of the siloxane oligomer in the oil-in-water silicone emulsion composition of the present invention can be measured by gas chromatography.

Applications of Oil-In-Water Silicone Emulsion Compositions: Surface Treatment Agent/Surface Modifying Agent The aforementioned oil-in-water silicone emulsion composition is applied to the surface of a substrate, and when the water content is removed by evaporation/heating, or the like, to form a cured film having rubber-like elasticity, a tack-free surface, and friction-reducing properties, and therefore the composition can be used as a surface treatment agent for the purpose of modifying the surface of a substrate.

In other words, the surface treatment method of the present invention performs a surface treatment on a substrate surface using a surface treatment agent containing the oil-in-water silicone emulsion composition, and at least a portion of the substrate surface can be covered by the cured film described above, and thus the surface condition can be modified. Herein, the surface treatment agent may be an oil-in-water silicone emulsion composition or a water dilution thereof, as described above, and may optionally include other additives.

The substrates to which the surface treatment agent of the present invention can be applied are not particularly limited, but examples include metal, ceramic, concrete, cement, mortar, paper, textile natural fiber fabric, synthetic fiber fabric, non-woven fabric, plastic, glass, rubber, wood, stone, and other composite materials as described above. In particular, the surface treatment agent of the present invention is capable of forming a cured film having rubbery and elastic properties, a tack-free surface, and friction-reducing properties when water is removed, and thus can be used to improve the functionality of functional fabrics such as airbags, emergency chutes for aircraft and hot air balloons, and building materials such as concrete. Furthermore, if necessary, water repellency, weatherability, chemical resistance, soft texture, and the like can be provided to the surface of various substrates by the silicone elastic body, and furthermore, improvements in heat resistance and flame retardancy can be expected due to the silicone elastic body.

The method of surface treatment of a substrate surface with the oil-in-water type silicone emulsion composition described above preferably includes the steps of (I) coating the substrate surface with the oil-in-water type silicone emulsion composition, and (II) removing water in the oil-in-water type silicone emulsion composition on the substrate surface to form a cured film.

Specific means of step (I) can be a coating method or application method that is used with paints or coating materials, without any particular limitation, and examples include brush application, spray application, dipping (dipping), flow coating, dispenser application, roller application using a gravure roller, knife coating, spin coating, and the like. The application can be performed a plurality of times, rather than just a single coat. In addition, the surface of the material to be coated or be applied upon may be pre-cleaned, dried and primed, prior to coating. In addition, the amount of coating/application is not particularly limited, and the coating may be thinly applied on a functional fabric such as an airbag or on a silicone rubber coating surface to reduce weight, or can be applied thickly to form a cured film having an excellent durability on the surface of the substrate.

The water content removal of step (II) may be performed by allowing to air dry at room temperature, or by leaving at an ambient temperature adjusted to 20 to 200° C., or by irradiating with infrared light, ultraviolet light, and or other high energy beam.

EXAMPLES

The present invention is described below in detail based on examples and comparative examples. In the examples, the viscosity is measured at 25° C. The term "parts" in the blended amounts refers to parts by mass, and the term "%" indicating the amount refers to the mass %. Note that in the formula, Me represents a methyl group, and Et represents an ethyl group.

The average particle size of the emulsion particles was measured using a submicron particle analyzer (Coulter Electronics Inc. COULTER MODEL N4 MD) using a dynamic light scattering method at 25° C., or calculated by single dispersion mode analysis.

The viscosity of the emulsion composition was measured at 25° C. using a Wells-Brookfield Cone/Plate Viscometer provided with a 20 mm diameter 2° tapered cone, at a shear rate of 1s-1 measured (ASTM D4287).

Evaluation of Cured Film

The oil-in-water silicone emulsion composition (coating film-forming composition) of each example was applied by gravure roller coating to a coating surface of a woven nylon airbag fabric, heat cured at 140° C., and evaluated for the following items.

Uniformity: The uniformity was visually evaluated for a coating film formed when the coating film composition was applied at a rate of 20 g/m2.

Friction reduction: As an indicator of initial wear resistance, the coefficient of kinetic friction was measured when the coating film composition was applied at a rate of 25 g/m2.

Friction reduction after scribing: Scribing was performed by a finger 10 times, and then evaluated by finger touch.

Example 1

92.5 parts of (a) polydimethylsiloxane blocked with a hydroxydimethylsiloxy group at both ends of a molecular chain and having a viscosity of 2400 mPa-s and 7.5 parts of (b) polysiloxane containing an aminoxy group expressed by Formula (1):

$Et_2NO(Me_2SiO)_7NEt2$ were uniformly blended in a preblended dispersion containing 7.5 parts of (C2) polyoxyethylene-polyoxypropylene copolymer type nonionic emulsifier (Product name: Pluronic (registered trademark) F108 manufactured by Adeka) and 12.5 parts of (C1) a 40% aqueous solution of sodium alkane sulfonate, and emulsified in an emulsifier.

86 parts of (D) water, 44.0 parts of (B-1) colloidal silica (Product name: Snowtex 30 produced by Nissan Chemical, active ingredient 30%, pH 10, colloidal silica surface stabilized with sodium), and 1.25 parts of (G) diethylamine were added to the emulsion that was obtained, and then uniformly blended. Furthermore, 2.5 parts of (F) methyltriethoxysilane was added, blended uniformly, and allowed to stand at room temperature for 2 weeks, then 125 parts of (B-2) colloidal silica (Nissan Chemical product name: Snowtex 30, active ingredient 30%, pH 10, surface stabilized by sodium) was added and mixed uniformly to produce an oil-in-water type silicone emulsion (No. 1). The total amount of silica particles was 50.7 parts.

The viscosity of the reacted organopolysiloxane (A) obtained by emulsion polymerization was measured by the following procedure. 92.5 parts of (a) polydimethylsiloxane blocked with a hydroxydimethylsiloxy group at both ends of a molecular chain and having a viscosity of 2400 mPa·s and 7.5 parts of (b) polysiloxane containing an aminoxy group expressed by Formula (1): $Et_2NO(Me_2SiO)_7NEt2$ were uniformly blended in a pre-blended dispersion containing 7.5 parts of (C2) polyoxyethylene-polyoxypropylene copolymer type nonionic emulsifier (Product name: Pluronic (registered trademark) F108 manufactured by Adeka) and 12.5 parts of (C1), a 40% aqueous solution of sodium alkane sulfonate, and emulsified in an emulsifier. After allowing to sit for one week, 10 g of isopropyl alcohol was added to 10 g of the prepared emulsion while stirring, and only the precipitated dimethylsiloxane was dried at 105° C. for 3 hours, and measured using a Brookfield type viscometer. The viscosity at 25° C. was 1,800,000 mPa·s.

12 parts of the silicone emulsion (No. 1) obtained above was uniformly blended with a dispersion obtained by adding 73 parts of (E) 1.5% aqueous solution of an anionic polymer composite purified bentonite (product name: Venger W100U: Hojun Co., Ltd.) and 15 parts of talc powder, to obtain the oil-in-water silicone emulsion composition of the present invention (coating film composition).

When the resulting oil-in-water silicone emulsion was allowed to sit at 25° C., no separation was observed even after 6 months, and the dispersion state was stable. In addition, when evaluated by the method described above, a cured film could be formed. The results are shown in Table 1.

Example 2

A silicone emulsion (No. 2) and a coating film composition were prepared by the same method as Example 1, except that the total amount of silica particles was changed to 65.7 parts, and an evaluation was carried out by the same method as Example 1. The results are shown in Table 1.

Example 3

A silicone emulsion (No. 3) and a coating film composition were prepared by the same method as Example 1, except that the total amount of silica particles was changed to 73.2 parts, and an evaluation was carried out by the same method as Example 1. The results are shown in Table 1.

Comparative Example 1

A silicone emulsion (No. C1) and a coating film composition were prepared by the same method as Example 1, except that total amount of silica particles was changed to 24.75 parts, and the evaluation was carried out by the same method as Example 1. The results are shown in Table 1.

Comparative Example 2

A silicone emulsion (No. C2) and a coating film composition were prepared by the same method as Example 1, except that total amount of silica particles was changed to 35.7 parts, and the evaluation was carried out by the same method as Example 1.

TABLE 1

| | Example 1 | Example 2 | Example 3 | Comparative Example 1 | Comparative Example 2 |
|---|---|---|---|---|---|
| Viscosity (mPa·s) | 37100 | 36400 | 48700 | 21300 | 35400 |
| Uniformity | Favorable | Favorable | Favorable | Repellent | Repellent |
| Kinetic coefficient of friction | 0.35 | 0.36 | 0.35 | 0.51 | 0.38 |
| Abrasion resistance after scrubbing | Smooth and slippery | Smooth and slippery | Smooth and slippery | Tacky | Tacky |

SUMMARY

The oil-in-water type silicone emulsion composition (=coating film composition) of Examples 1 to 3 provided a coating film having a solid content of the colloidal silica that was within the scope of the present invention, and thus a coating film having excellent uniformity was formed, and a smooth cured film could be formed on a substrate. On the other hand, in Comparative Examples 1 and 2, the uniformity of the coating film was insufficient and the friction reduction was inferior compared to the examples, and a coating film with reduced surface tackiness (tack) could not be achieved.

INDUSTRIAL APPLICABILITY

The oil-in-water type silicone emulsion composition of the present invention has favorable storage stability even though it contains colloidal silica, and when water content is removed after application or impregnation on a substrate, a cured film with rubber-like elasticity, or in other words, excellent strength is formed. Therefore the composition is useful in water-based paints and inks, as a paper coating agent for thermal paper and inkjet paper, a mold release agent for molds and rubber, a resin coating agent for automotive weather stripping, gaskets and rubber hoses, a fiber treatment agent for clothing and airbags, as well as a release agent, cosmetic, construction material, and the like.

The invention claimed is:

1. An oil-in-water silicone emulsion composition, comprising:
   (A) 100 parts by mass of a polyorganosiloxane having at least two hydroxyl groups or hydrolyzable groups bonded to a silicon atom in one molecule, and having a viscosity at 25° C. of from 100,000 to 20,000,000 mPa·s;
   (B) 45 to 120 parts by mass of colloidal silica, based on solid content;
   (C1) 1 to 100 parts by mass of an ionic emulsifier; and
   (D) 0 to 500 parts by mass of water, excluding water content in the colloidal silica;
   wherein the viscosity at 25° C. of the total composition is at least 1,000 mPa·s.

2. The oil-in-water silicone emulsion composition according to claim 1, further comprising: (C2) 0.1 to 50 parts by mass of a polyoxyethylene-polyoxypropylene copolymerized nonionic emulsifier.

3. The oil-in-water silicone emulsion composition according to claim 1, further comprising: (E) a thickening agent.

4. The oil-in-water silicone emulsion composition according to claim 3, wherein component (E) is one or more types selected from the group consisting of (E1) thickening agents containing a clay mineral, and (E2) thickening agents containing a water-soluble organic polymer.

5. The oil-in-water silicone emulsion composition according to claim 1, further comprising: (F) 0.1 to 50 parts by mass of a partially hydrolyzed condensation product of an alkoxysilane or alkoxyalkoxysilane, expressed by $R^1{}_a SiX_{4-a}$ where $R^1$ is a unsubstituted monovalent hydrocarbon group or a substituted monovalent hydrocarbon group, X is an alkoxy group or an alkoxyalkoxy group, and a is 0, 1 or 2.

6. The oil-in-water silicone emulsion composition according to claim 1, further comprising: (G) an amine compound.

7. The oil-in-water silicone emulsion composition according to claim 1, wherein the average primary particle size is 50 to 600 nm.

8. The oil-in-water silicone emulsion composition according to claim 1, wherein component (A) is obtained from (a) a polyorganosiloxane having at least two hydroxyl groups or hydrolyzable groups bonded to a silicon atom and having a viscosity lower than component (A) serving as a precursor of component (A), or (b) a polyorganosiloxane obtained by emulsion polymerizing an organic silicon compound containing an aminoxy group having an average of two aminoxy groups bonded to a silicon atom in one molecule, in the presence of component (C1) and optionally (C2) 0.1 to 50 parts by mass of a polyoxyethylene-polyoxypropylene copolymerized nonionic emulsifier.

9. A surface treatment agent, comprising the oil-in-water silicone emulsion composition according to claim 1.

10. A surface treatment method, comprising performing surface treatment using the oil-in-water silicone emulsion composition according to claim 1.

11. A substrate that has been surface treated with the oil-in-water silicone emulsion composition according to claim 1.

* * * * *